(12) United States Patent
   Cha (10) Patent No.: US 9,380,138 B2
(45) Date of Patent: Jun. 28, 2016

(54) ELECTRONIC DEVICE COVER

(71) Applicant: Samsung Electronics Co., Ltd., Gyeonggi-do (KR)

(72) Inventor: Jung Yoon Cha, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/630,913

(22) Filed: Feb. 25, 2015

(65) Prior Publication Data

US 2015/0264164 A1   Sep. 17, 2015

(30) Foreign Application Priority Data

Mar. 13, 2014   (KR) ........................ 10-2014-0029377

(51) Int. Cl.
   *H04M 1/02* (2006.01)
   *A45C 11/00* (2006.01)
   *H04M 1/18* (2006.01)
   *H04M 1/725* (2006.01)
   *A45C 13/00* (2006.01)

(52) U.S. Cl.
   CPC ............ *H04M 1/0283* (2013.01); *A45C 11/00* (2013.01); *H04M 1/185* (2013.01); *A45C 13/005* (2013.01); *A45C 2011/002* (2013.01); *A45C 2011/003* (2013.01); *H04M 1/0214* (2013.01); *H04M 1/0241* (2013.01); *H04M 1/72527* (2013.01)

(58) Field of Classification Search
   CPC . H04M 1/0283; H04M 1/185; H04M 1/0241; H04M 1/0214; H04M 1/72527; A45C 11/00; A45C 2011/002; A45C 2011/003
   See application file for complete search history.

(56) References Cited

U.S. PATENT DOCUMENTS

| | | | | |
|---|---|---|---|---|
| 7,398,114 B2 * | 7/2008 | Gartrell | ............... | H01H 13/702 361/814 |
| 8,289,687 B2 * | 10/2012 | Weinstein | ............. | G06F 1/1677 361/679.3 |
| 2007/0265032 A1 * | 11/2007 | Aisenberg | ........... | H04M 1/0279 455/556.1 |
| 2007/0285880 A1 * | 12/2007 | Weinstein | ............. | G06F 1/1626 361/679.27 |
| 2010/0056222 A1 * | 3/2010 | Choi | .................... | H04M 1/0245 455/566 |
| 2010/0105435 A1 * | 4/2010 | Ueda | ................... | H04M 1/0245 455/563 |
| 2011/0159924 A1 * | 6/2011 | Gonzalez | ............ | H04M 1/0283 455/557 |
| 2013/0076614 A1 * | 3/2013 | Ive | ........................ | G06F 1/1677 345/156 |
| 2014/0128131 A1 * | 5/2014 | Sin | ........................ | H04M 1/185 455/575.8 |
| 2015/0005034 A1 * | 1/2015 | Agnes Desodt | ..... | H04B 1/3888 455/566 |
| 2015/0065207 A1 * | 3/2015 | Hong | ................... | H04M 1/0245 455/575.3 |
| 2015/0094119 A1 * | 4/2015 | Lee | ........................ | G06F 3/0484 455/566 |
| 2015/0105128 A1 * | 4/2015 | Huang | ................... | H04B 1/3888 455/575.8 |
| 2015/0155903 A1 * | 6/2015 | Jang | ...................... | H04B 1/3888 455/575.8 |
| 2015/0229754 A1 * | 8/2015 | Won | ................... | H04M 1/72563 455/575.8 |

FOREIGN PATENT DOCUMENTS

| KR | 10-1249938 B1 | 4/2013 |
|---|---|---|
| KR | 10-2013-0094274 A | 8/2013 |

* cited by examiner

*Primary Examiner* — Nathan Mitchell
(74) *Attorney, Agent, or Firm* — Cha & Reiter, LLC

(57) ABSTRACT

An electronic device is provided comprising: a display screen; a sensing unit for sensing a respective state of each one of a plurality of sub-covers, the plurality of sub-covers being part of a cover for protecting the display screen; and a controller configured to perform an operation based on the respective state of each one of the plurality of sub-covers.

20 Claims, 6 Drawing Sheets

ELECTRONIC DEVICE COVER

CLAIM OF PRIORITY

The priority of Korean patent application No. 10-2014-0029377 filed Mar. 13, 2014, the disclosure of which is hereby incorporated in its entirety by reference, is claimed.

BACKGROUND

1. Field of the Disclosure The present disclosure relates to electronic devices and more particularly to an electronic device cover and method for using the same.

2. Background of the Disclosure

Portable electronic devices may be damaged when dropped or bumped into another object. For this reason, an increasing number of users carry their devices in protective cases. Such protective cases may be broadly classified into cases that protect only the side and rear surfaces of a portable device and flip-type casts that also protect the device's front surface. A disadvantage of the cases that cover the device's side and rear surfaces is that they leave the device's screen vulnerable to damage. By contrast, a disadvantage of the flip-type cases is that they can completely obscure the screen of the device. Accordingly, the need exists for new device case designs.

SUMMARY

The present disclosure addresses this need. According to one aspect of the disclosure, an electronic device is provided comprising: a display screen; a sensing unit for sensing a respective state of each one of a first plurality of sub-covers, the first plurality of sub-covers being part of a cover for protecting the display screen; and a controller configured to: generate a signature representing a current state of the cover based on the respective state of each one of the first plurality of sub-covers; and perform an operation that is identified based on the signature.

According to another aspect of the disclosure, a method is provided comprising: detecting, by a sensing unit, a respective state of each one of a first plurality of sub-covers, the first plurality of sub-covers being part of a cover for protecting a display screen; and generating, by a controller, a signature representing a current state of the cover based on the respective state of each one of the first plurality of sub-covers; and perform, by the controller, an operation that is identified based on the signature.

DETAILED DESCRIPTION

The detailed description is provided with reference to the accompanying drawings. However, it is to be understood that the disclosure is not limited to the embodiments depicted in the drawings. It should further be understood that the drawings are not intended to limit the claims to the embodiments depicted in the drawings. Like reference numerals refer to like elements.

The terms "include," "comprise," "including," or "comprising" as used herein indicate disclosed functions, operations, or existence of elements but do not exclude other functions, operations or elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The word "or" as used herein means and/or. For example, the expression "A or B" may indicate only one of A and B, or both A and B.

Terms such as "first", "second", and the like may refer to various elements without limiting the order and/or priority of the elements. Furthermore, such terms may be used to distinguish one element from another element. For example, "a first user device" and "a second user device" may be used to refer to different devices.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

An electronic device according to the present disclosure may include at least one of a smartphone, a tablet personal computer (PC), a mobile phone, a video telephone, an electronic book reader, a desktop PC, a laptop PCs, a network computer, a personal digital assistant (PDA), a portable multimedia player (PMP), an MP3 player, a mobile medical device, a camera, a wearable device (e.g., head-mounted-devices (HMDs) such as electronic glasses), electronic apparel, an electronic bracelet, an electronic necklace, an electronic appcessory, an electronic tattoo, a smart watch, and/or any other suitable type of device.

Additionally or alternatively, the electronic device may include a smart home appliance having communication functions. The smart home appliance may include at least one of, for example, a TV, a DVD player, a refrigerator, an air conditioner, a vacuum cleaner, an oven, a microwave oven, a washing machine, an air filter, a set-top box, a TV box (e.g., Samsung HomeSync™, Apple TV™, or Google TV™), a game console, an electronic dictionary, an electronic key, a camcorder, an electronic picture frame, and/or any other suitable type of device.

Additionally or alternatively, the electronic device may include at least one of a medical device (e.g., magnetic resonance angiography (MRA), magnetic resonance imaging (MRI), computed tomography (CT), scanners, and ultrasonic devices), a navigation device, a global positioning system (GPS) receiver, an event data recorder (EDR), a flight data recorder (FDR), a vehicle infotainment device, electronic equipment for vessels (e.g., navigation systems and gyrocompasses), avionics, a security device, a head units for vehicles, an industrial or home robot, an automatic teller machine (ATM), a points of sale terminal (POS), and/or any other suitable type of device.

In some aspects, electronic devices according to the present disclosure may include any suitable combination of the above-mentioned devices. Furthermore, electronic devices according to the present disclosure may be flexible devices. In addition, it would be obvious to those skilled in the art, after reading the disclosure, that electronic devices according to the present disclosure are not limited to the above-mentioned devices. The term "user" used herein may refer to a person who uses an electronic device or may refer to a device (e.g., an artificial electronic device) that uses an electronic device.

Figure 1A:
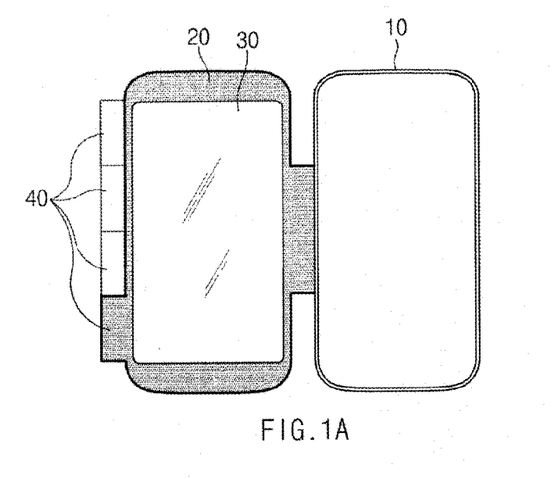
FIG. 1A, FIG. 1B and FIG. 1C are diagrams depicting an example of an electronic device case, according to aspects of the disclosure.
Figure 1B:
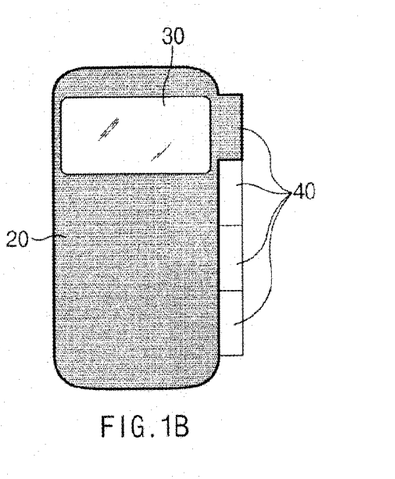
Figure 1C:
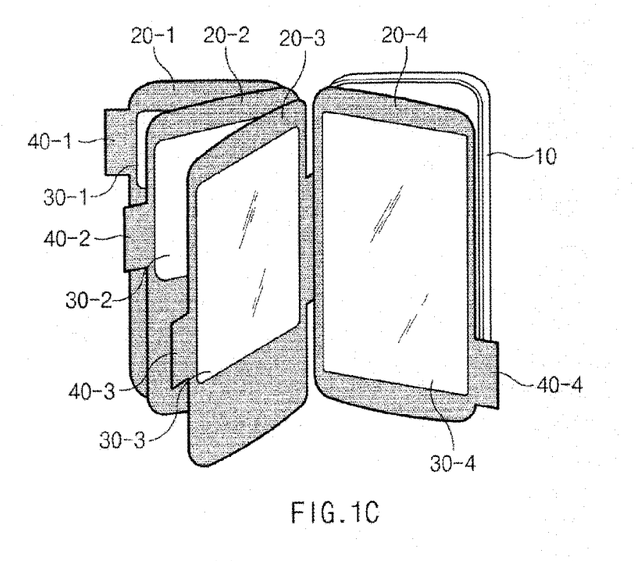

FIGS. 1A-C are diagrams depicting an example of an electronic device case, according to aspects of the disclosure. As illustrated, the case (or cover) may include a coupling part 10 and a cover part 20. FIG. 1A illustrates a front view of the case when the cover part 20 is opened, FIG. 1B illustrates a front view of the case when the cover part 20 of the case is closed, and FIG. 1C depicts a perspective view of the case in which each of a plurality of sub-covers 20-1, 20-2, 20-3, and, 20-4 included in the cover part 20 is opened.

According to aspects of the disclosure, the case may be coupled to an electronic device. In some implementations, the case may be coupled to the electronic device through the coupling unit 10. The coupling unit 10 may attach to the rear surface (and/or another surface) of the electronic device.

The cover part 20 may cover the display surface (or a front surface) of the electronic device. According to aspects of the disclosure, the cover part 20 may extend from the coupling part 10 and cover the entire (or at least some) display surface of the electronic device. Additionally or alternatively, the cover part 20 may be hingedly coupled to the coupling unit 10.

According to aspects of the disclosure, the cover part 20 may include sub-covers 20-1, 20-2, 20-3, and 20-4. Although the cover part 20 is depicted in FIG. 3C as including four sub-covers 20-1, 20-2, 20-3, and 20-4, the cover part 20 may include any suitable number of sub-covers (e.g., 1, 2, 5, 10, etc.).

According aspects of the disclosure, each of the sub-covers 20-1, 20-2, 20-3, and 20-4 may include a respective one of transparent windows 30-1, 30-2, 30-3, and 30-4. The transparent windows may permit the user to view information displayed on the display when the covers are closed.

According to aspects of the disclosure, the transparent windows 30-1, 30-2, 30-3, and 30-4 may have different sizes. In some implementations, the closer a given sub-cover is in the stack of sub-covers to the display screen of the device, the larger the transparent windows' size might be. For example, the sub-cover 20-1 may have the smallest window size, whereas the sub-cover 20-4 may have the largest window size. As illustrated in FIG. 1C, the transparent window 30-2 of the second sub-cover 20-2 is wider than the transparent window 30-1 of the first sub-cover 20-1 and narrower than the transparent window 30-3 of the third sub-cover 20-3. Additionally or alternatively, two or more of the transparent windows 30-1, 30-2, 30-3, and 30-4 may have the same size.

According to aspects of the disclosure, each of the plurality of sub-covers 20-1, 20-2, 20-3, and 20-4 may optionally include a respective one of tabs 40-1, 40-2, 40-3, and 40-4. According to aspects of the disclosure, the tabs 40-1, 40-2, 40-3, and 40-4 included in the respective sub-covers 20-1, 20-2, 20-3, and 20-4 may extend from respective edges of the sub-covers that are positioned at a particular side of the device. Additionally or alternatively, the tabs 40-1, 40-2, 40-3, and 40-4 may be distributed along the side of the device, as shown. For example, as illustrated in FIG. 1B, the plurality of tabs 40 may extend from the right edge (or edge opposite the coupling unit 10) of the sub-covers. In addition, as illustrated in FIG. 1B, the plurality of tabs 40 may be positioned at different positions along a longitudinal axis (or any other axis) of the cover part 20. In some implementations, one or more of the tabs 40-1, 40-2, 40-3, and 40-4 may be omitted.

Figure 2A:
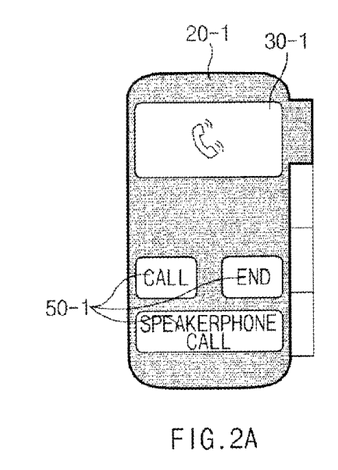
FIG. 2A and FIG. 2B are diagrams illustrating an example of a process for using the case of FIGS. 1A-C, according to aspects of the disclosure.
Figure 2B:
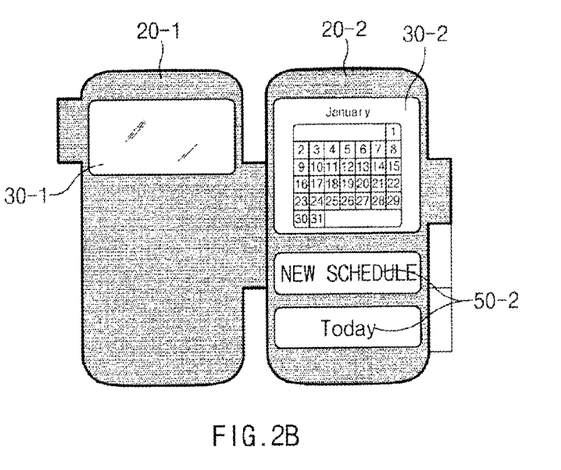

FIGS. 2A-B are diagrams illustrating an example of a process for using the case of FIGS. 1A-C, according to aspects of the disclosure. More particularly, FIG. 2A depicts the case when each of the sub-covers 20-1, 20-2, 20-3, and 20-4 is closed. FIG. 2B, on the other hand, depicts the case when the sub-cover 20-1 is opened and the sub-covers 20-2, 20-3, and 20-4 are closed.

According to aspects of the disclosure, a different UI graphic 50 may be printed on each of the plurality of sub-covers. For example, as illustrated in FIG. 2A, a graphic 50-1 may be printed on the sub-cover 20-1. The graphic 50-1 may include a 'call', 'end', or 'speakerphone call' images. Similarly, as illustrated in FIG. 2B, a graphic 50-2 may be printed on the sub-cover 20-2. The graphic 50-2 may include a 'new schedule' or 'Today' images.

According to aspects of the disclosure, each of the images in the graphic 50-1 (or 50-2) may correspond to a different user interface (UI) element that is displayed on the display screen of the electronic device. For example, as illustrated in FIG. 2A, when a call is received in the electronic device while all sub-covers are closed, the display of the electronic device may display a first UI corresponding to the graphic 50-1. The first UI may include a first plurality of input components (e.g., buttons). Each input component in the first plurality may be displayed at a position corresponding to (e.g., at least partially underneath) a different one of the images in the graphic 50-1. As another example, as illustrated in FIG. 2B, in response to the sub-cover 20-1 being opened, the electronic device may display a second UI. The second UI may include a second plurality of input components (e.g., buttons). Each input component in the second plurality may be displayed at a position corresponding to (e.g., at least partially underneath) a different one of the images in the graphic 50-2.

Figure 3:
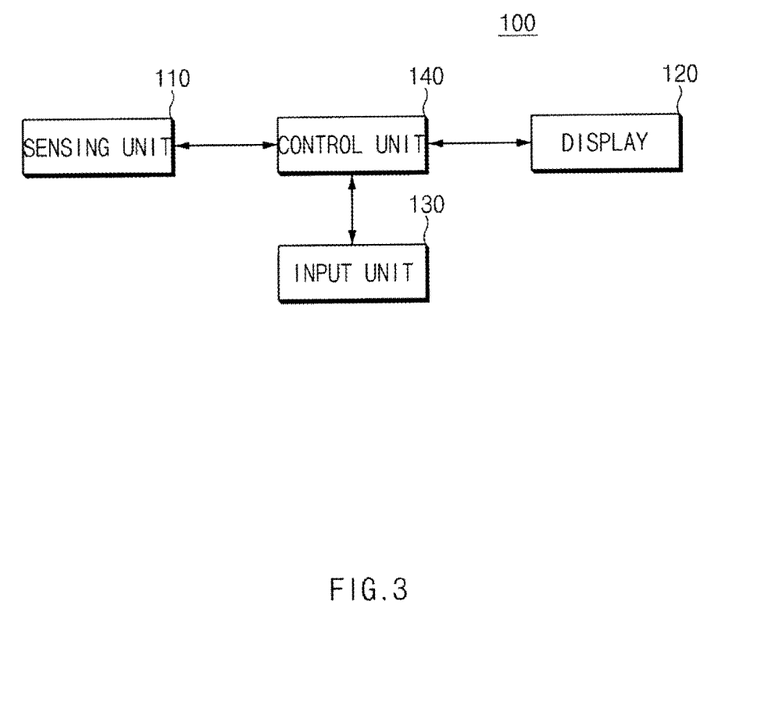
FIG. 3 is a block diagram of an example of an electronic device, according to aspects of the disclosure.

FIG. 3 is a block diagram of an example of an electronic device, according to aspects of the disclosure. Referring to FIG. 3, the electronic device 100 may include a sensing unit 110, a display 120, an input part 130, and a control unit 140.

Figure 4:
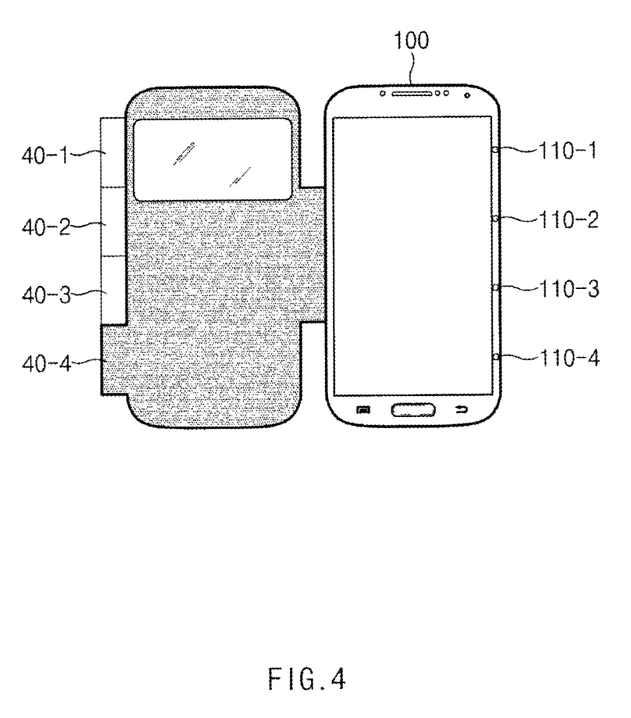
FIG. 4 is a diagram of an example of a sensing unit, according to aspects of the disclosure.

The sensing unit 110 may sense whether any of the sub-covers in the cover part 20 is opened. FIG. 4 illustrates an example of one possible implementation of the sensing unit 110. According to the example, the sensing unit 110 may include a plurality of sensors 110-1, 110-2, 110-3, and, 110-4 (e.g., Hall sensors) for sensing whether respective ones of the sub-covers 20-1, 20-2, 20-3, and 20-4 are opened. For example, as illustrated in FIG. 4, the sensing unit 110 may include the same number of sensors as that of the sub-covers.

According to aspects of the disclosure, when the sensing unit 110 is implemented with a plurality of sensors, the plurality of sensors may be respectively positioned at points corresponding to tabs included in the sub-covers. For example, as illustrated in FIG. 4, the plurality of sensors 110-1, 110-2, 110-3, and 110-4 may be implemented at points at which the plurality of tabs 40-1, 40-2, 40-3, and 40-4 are positioned when the sub-covers are closed.

The display 120 may include any suitable type of display, such as an LCD display, an LED display, etc. In operation, the display 120 may display any suitable type of information. For example, the display 120 may display an icon notifying that a call is received.

According to aspects of the disclosure, when the sizes of the transparent windows respectively formed in the sub-covers are different from each other, the display 120 may display information in an area corresponding to the outermost sub-cover that is currently closed. As illustrated in FIG. 2A, when the sub-cover 20-1 is closed, the display 120 may display information in a region that corresponds to the window 30-1 (e.g., a region that is visible through the window 30-1). Similarly, as illustrated in FIG. 2B, when the sub-cover 20-1 is opened while the sub-cover 20-2 remains closed, the display 120 may display a calendar in a region that corresponds to the window 30-2 (e.g., a region that is visible through the window 30-2 and all other windows underneath it).

According to aspects of the disclosure, the display 120 may display a UI corresponding to a UI graphic printed on one of the sub-covers. For example, referring to FIG. 2A, when a call is received in the electronic device 100 in a state where all the sub-covers are closed, the display 120 may display a UI corresponding to a UI graphic printed on the first sub-cover 20-1 at a position corresponding to the UI graphic. As another example, referring to FIG. 2B, as the first sub-cover 20-1 is opened and a schedule management application is executed, the display 120 may display a UI corresponding to a UI graphic printed on the second sub-cover 20-2 at a position corresponding to the UI graphic.

The input unit 130 may receive user input for controlling the electronic device 100. The input unit 130 may be variously implemented according to a kind of the electronic device 100. For example, when the electronic device 100 is a smart phone, the input unit 130 may be implemented with a touch screen or a speech recognition sensor (e.g., a microphone and/or circuitry for recognizing speech).

According to aspects of the disclosure, the input unit 130 may receive user input when the sub-covers are closed. Accordingly, when the user touches UI graphics 50 printed on the sub-covers, the electronic device 100 may perform corresponding operations based on the user input.

The control unit 140 may include any suitable type of processing circuitry, such as at least one of general-purpose processor (e.g., an ARM-based processor, a MIPS-based processor), an Application-Specific Integrated Circuit (ASIC), a Field-Programmable Gate Array (FPGA), a Digital Signal Processor (DSP), a Programmable Logic Device (DLP), etc. In some implementations, the control unit 140 may control the electronic device so that corresponding operations may be performed according to opened or closed states of the plurality of sub-covers. For example, the control unit 140 may execute a pre-set application when a given one of the plurality of sub-covers is opened and/or closed. More particularly, when one of the plurality of sub-covers is opened or closed, the control unit 140 may hide information that is currently displayed on the display 120 and display new information instead. Additionally or alternatively, when one of the plurality of sub-covers is opened or closed, the control unit 140 may initiate a call to a preset phone number. Additionally or alternatively, when one of the plurality of sub-covers is opened or closed, the control unit 140 may relocate information currently displayed in a first region of the display 120 to a second region. The second region may be one that is visible through the window of the outermost sub-cover that is currently closed, as well as the windows of all other sub-covers that are positioned underneath the outermost sub-cover. For instance, in the example of FIG. 2A, the outermost sub-cover that is currently closed is the sub-cover 20-1. By contrast, in the example of FIG. 2B, the outermost sub-cover that is currently closed is the sub-cover 20-2.

Figure 5A:
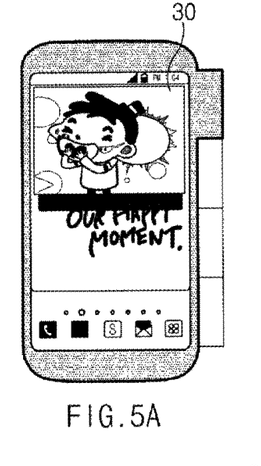
FIG. 5A, FIG. 5B and FIG. 5C are diagrams illustrating an example of a process for using the cover of FIGS. 1A-C, according to aspects of the disclosure.
Figure 5B:
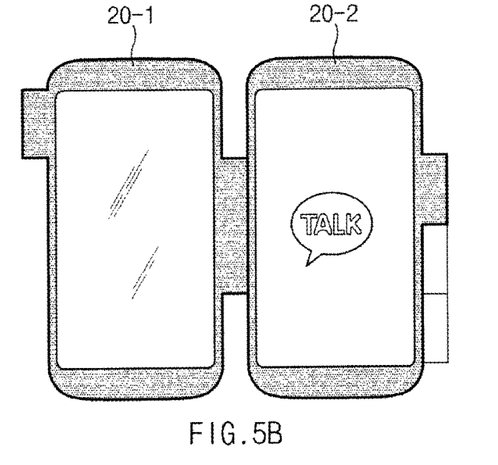
Figure 5C:
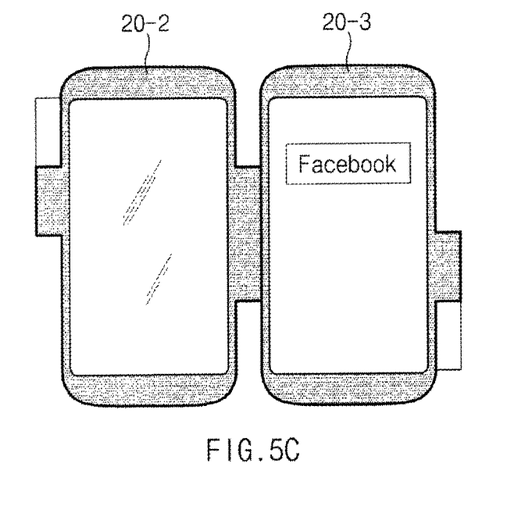

FIGS. 5A-C are diagrams illustrating an example of a process for using the cover of FIGS. 1A-C, according to aspects of the disclosure. FIG. 5A depicts an electronic device when all sub-covers of the cover part 20 are closed. As illustrated, when the sub-cover 20-1 is closed, the user may view information displayed on the display 120 through the transparent windows 30 formed in each of the sub-covers underneath the sub-cover 20-1. In some implementations, when the user opens or closes a given one of the sub-covers, the control unit 140 may execute a preset application. For example, as illustrated in FIG. 5B, when the user opens the first sub-cover 20-1, the control unit 140 may execute an instant message service (IMS) application. Furthermore, as illustrated in FIG. 5C, when the user opens the second sub-cover 20-2, the control unit 140 may execute a social network service (SNS) application. Stated succinctly, in some implementations, each of the sub-covers 20-1, 20-2, 20-3, and 20-4 may be associated with a different application (and/or operation). When a given one of the sub-covers 20-1, 20-2, 20-3, and 20-4 is opened, an interface corresponding to the cover's respective application (and/or operation) may be presented on the display 120.

Figure 6:
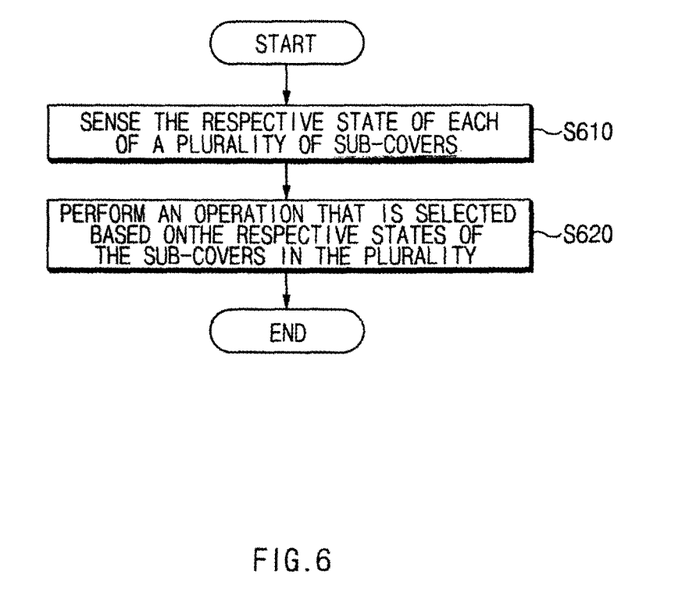
FIG. 6 is a flowchart of a process, according to aspects of the disclosure.

FIG. 6 is a flowchart of a process, according to aspects of the disclosure. In operation 610, the electronic device 100 may sense the state of each of the plurality of sub-covers 20-1, 20-2, 20-3, 20-4. For example, for each of the sub-covers 20-1, 20-2, 20-3, and 20-4, the electronic device 100 may determine whether that sub-cover is opened or closed. In some implementations, the electronic device 100 may determine the respective states of the sub-covers 20-1, 20-2, 20-3, and 20-4 by using the sensors 110-1, 110-2, 110-3, and 110-4, as discussed above. After the respective states of the sub-covers 20-1, 20-2, 20-3, and 20-4 are determined, a signature representing the current state of the cover part 20 may be generated. The signature may include a symbol, a numerical string (e.g., a number), an alphanumerical string, and/or any suitable type of string, number, character, or symbol. In some implementations, the signature may be generated based on the respective states of each one of the sub-covers 20-1, 20-2, 20-3, and 20-4.

In operation 620, the electronic device 100 may perform any suitable type of operation that is associated with the combination of states of the sub-covers 20-1, 20-2, 20-3, and 20-4 (or the signature). For example, the operation may be performed in response to detecting that one of the sub-covers is opened or closed. In some implementations, performing the operation may include at least one of executing an application, displaying a screen corresponding to the application, changing the position on the screen of information that is currently displayed (e.g., moving the information to a position in the display unit 120 that is visible through the respective windows of all closed sub-covers, etc.), initiate a call (or another telecommunications session) with a predetermined far-end party, etc.

In some implementations, the process of FIG. 6 may be implemented using processor-executable instructions. The processor-executable instructions may be stored in any suitably type of non-transitory recording medium, such as a flash memory, a read only memory (ROM), an erasable programmable ROM (EPROM), an electronically erasable and programmable ROM (EEPROM), a hard disk, a removable disk, a memory card, a USB memory, and a CD-ROM.

FIGS. 1-6 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples. It will be further understood that the word "print" or "printed" may refer to any suitable technique for creating a visual representation in the sub-covers 20-1, 20-2, 20-3, and 20-4, such as embossing, etching, ink-printing, stamping, etc.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device configured to be coupled to a cover comprising:
    a display screen;
    a sensing unit for detecting which of the open and closed states of each one of a plurality of sub-covers is the current state of each one of the sub-covers, the plurality of sub-covers being part of the cover and each one of the sub-covers being transitionable between an open state and a closed state, wherein when in the closed state, the plurality of sub-covers overlap one another and cover the display screen, and wherein the sub-covers are configured to be successively opened to reveal underlying ones of the plurality of sub-covers, the underlying ones of the plurality of sub-covers being stacked atop one another; and
    a controller configured to perform an operation based on which ones of the plurality of sub-covers are in the closed state.

2. The electronic device of claim 1, wherein performing the operation includes generating a signature representing a current state of the cover based on the respective state of each one of the plurality of sub-covers and performing an operation that is identified based on the signature.

3. The electronic device of claim 1, wherein each one of the sub-covers includes a respective window, and the controller further configured to display information in a region of the display screen that is exposed though the respective windows of all sub-covers in the plurality that are currently closed.

4. The electronic device of claim 1, wherein performing the operation includes executing an application based on the respective state of each one of the plurality of sub-covers.

5. The electronic device of claim 1, wherein the performing the operation includes automatically initiating a telephone call with a preset telephone number.

6. The electronic device of claim 1, wherein the sensing unit includes plurality of sensors, and each one of the plurality of sensors is for sensing whether a corresponding sub-cover from the plurality is opened.

7. The electronic device of claim 1, wherein performing the operation includes displaying a user interface that matches a graphic printed on an outermost sub-cover that is currently closed.

8. The electronic device of claim 7, wherein the graphic includes at least one image and the user interface comprises at least one input component, wherein the at least one input components is located at least partially underneath of the at least one image.

9. A controlling method of electronic device configured to be coupled to a cover comprising:
    detecting, by a sensing unit, which of the open and closed states of each one of a plurality of sub-covers is the current state of each one of the sub-covers, the plurality of sub-covers being part of the cover and each one of the sub-covers being transitionable between an open state and a closed state, wherein when in the closed state, the plurality of sub-covers overlap one another and cover a display screen, and wherein the sub-covers are configured to be successively opened to reveal underlying ones of the plurality of sub-covers, the underlying ones of the plurality of sub-covers being stacked atop one another; and
    performing, by a controller, an operation based on which ones of the plurality of sub-covers are in the closed state.

10. The method of claim 9, wherein performing the operation includes generating a signature representing a current state of the cover based on the respective state of each one of the plurality of sub-covers, and
    performing an operation that is identified based on the signature.

11. The method of claim 9, wherein each one of the sub-covers includes a respective window, and the controller further configured to display information in a region of the display screen that is exposed though the respective windows of all sub-covers in the plurality that are currently closed.

12. The method of claim 9, wherein performing the operation includes executing an application based on the respective state of each one of the plurality of sub-covers.

13. The method of claim 9, wherein the performing the operation includes automatically initiating a telephone call with a preset telephone number.

14. The method of claim 9, wherein the sensing unit includes plurality of sensors, and each one of the plurality of sensors is for sensing whether a corresponding sub-cover from the plurality is opened.

15. The method of claim 9, wherein performing the operation includes displaying a user interface that matches a graphic printed on an outermost sub-cover that is currently closed.

16. The method of claim 15, wherein the graphic includes at least one image and the user interface comprises at least one input component, wherein the at least one input components is located at least partially underneath of the at least one image.

17. A case couplable to an electronic device including a display screen, the case comprising:
a coupling part detachable to at least a part of the electronic device; and
a cover part hingedly extended from the coupling part and coverable a display surface of the electronic device,
wherein the cover part includes a plurality of sub-covers that include a respective one of transparent windows, and
wherein each one of the sub-covers is transitionable between an open state and a closed state, wherein when in the closed state, the plurality of sub-covers overlap one another and cover the display screen, and wherein the sub-covers are configured to be successively opened to reveal underlying ones of the plurality of sub-covers, the underlying ones of the plurality of sub-covers being stacked atop one another.

18. The case according to claim 17, wherein the respective transparent windows formed in the plurality of the sub-covers have different sizes.

19. The case according to claim 18, wherein the size of the transparent windows formed in the plurality of sub-covers become larger from an outermost sub-cover to an innermost sub-cover.

20. The case according to claim 17, wherein at least one of the plurality of sub-covers has graphics printed thereon, which is matched to a user interface displayed on the electronic device when the at least one of the plurality of sub-cover is an outmost sub-cover that is currently closed.

* * * * *